(12) United States Patent
Bötzel et al.

(10) Patent No.: US 7,016,683 B2
(45) Date of Patent: Mar. 21, 2006

(54) FREQUENCY SCHEME FOR DATA TRANSMISSION SYSTEMS

(75) Inventors: Ulrich Bötzel, Kaarst (DE); Christian Kranz, Ratingen Lintorf (DE); André Neubauer, Krefeld (DE)

(73) Assignee: Infineon Technologies AG, Munich (DE)

( * ) Notice: Subject to any disclaimer, the term of this patent is extended or adjusted under 35 U.S.C. 154(b) by 202 days.

(21) Appl. No.: 10/629,924

(22) Filed: Jul. 30, 2003

(65) Prior Publication Data

US 2004/0192316 A1 Sep. 30, 2004

Related U.S. Application Data

(63) Continuation of application No. PCT/DE01/04961, filed on Dec. 28, 2001.

(30) Foreign Application Priority Data

Jan. 30, 2001 (DE) ................. 101 03 926

(51) Int. Cl.
*H04B 15/00* (2006.01)
*H04Q 7/00* (2006.01)
*H04J 3/06* (2006.01)

(52) U.S. Cl. ............. 455/450; 455/502; 370/330; 370/509

(58) Field of Classification Search .......... 455/553.1, 455/84, 76, 277.1, 450, 502, 417; 375/141, 375/279, 133, 445, 134; 343/141; 370/330, 370/347, 509, 342, 501
See application file for complete search history.

(56) References Cited

U.S. PATENT DOCUMENTS

| | | | | |
|---|---|---|---|---|
| 5,166,953 A | * | 11/1992 | Hershey et al. ............. 375/133 |
| 5,381,444 A | * | 1/1995 | Tajima ........................ 375/141 |
| 5,392,460 A | * | 2/1995 | Mattila et al. ................ 455/76 |
| 5,506,863 A | * | 4/1996 | Meidan et al. .............. 375/134 |
| 5,561,689 A | * | 10/1996 | Fleek et al. ................. 375/279 |
| 5,638,361 A | * | 6/1997 | Ohlson et al. .............. 370/342 |
| 5,794,159 A | * | 8/1998 | Portin ..................... 455/553.1 |
| 5,887,023 A | | 3/1999 | Mabuchi |
| 5,890,051 A | * | 3/1999 | Schlang et al. ............... 455/76 |
| 6,061,389 A | * | 5/2000 | Ishifuji et al. .............. 375/133 |
| 6,177,906 B1 | * | 1/2001 | Petrus ........................ 342/378 |
| 6,211,841 B1 | * | 4/2001 | Smith et al. ................. 343/813 |
| 6,219,539 B1 | * | 4/2001 | Basu et al. ................. 455/417 |
| 6,278,722 B1 | * | 8/2001 | Evans ........................ 375/133 |

(Continued)

FOREIGN PATENT DOCUMENTS

DE  37 30 672 A1  3/1989

(Continued)

OTHER PUBLICATIONS

Haartsen, J.: "Die-Bluetooth-Übertragung" [The Bluetooth-Transmitting], Funkschau, 1999, No. 15, pp. 76-80.

(Continued)

*Primary Examiner*—William Trost
*Assistant Examiner*—Kiet Doan
(74) *Attorney, Agent, or Firm*—Laurence A. Greenberg; Werner H. Stemer; Ralph E. Locher

(57) ABSTRACT

A data transmission system contains at least two stations between which data bursts are exchanged via radio. A frequency hop is provided between the first channel mid-frequency which is used for the transmission and the second channel mid-frequency which is used for the feedback transmission, the height of the frequency hop corresponding to the intermediate frequency. Therefore, the local oscillators must not be tuned to new frequencies between the transmission and the feedback transmission.

20 Claims, 3 Drawing Sheets

U.S. PATENT DOCUMENTS

| | | | |
|---|---|---|---|
| 6,381,231 B1 * | 4/2002 | Silventoinen et al. | 370/332 |
| 6,438,358 B1 * | 8/2002 | Higuchi | 455/84 |
| 6,459,704 B1 * | 10/2002 | Jandrell | 370/445 |
| 6,466,569 B1 * | 10/2002 | Wright et al. | 370/347 |
| 6,549,784 B1 * | 4/2003 | Kostic et al. | 455/501 |
| 6,603,979 B1 * | 8/2003 | Hirsch | 455/502 |
| 6,795,413 B1 * | 9/2004 | Uhlik | 370/330 |
| 6,836,648 B1 * | 12/2004 | Ritter | 455/277.1 |
| 6,859,486 B1 * | 2/2005 | Mohebbi | 375/132 |
| 6,931,030 B1 * | 8/2005 | Dogan | 370/509 |

FOREIGN PATENT DOCUMENTS

JP    04334222    11/1992

OTHER PUBLICATIONS

Lange, K. et al.: "Taschenbuch der Hochfrequenzlechnik" [Pocketbook for High-Frequency Engineering], Springer Verlag, $5^{th}$ Ed., 1992, pp. O53-O54.

* cited by examiner

FREQUENCY SCHEME FOR DATA TRANSMISSION SYSTEMS

CROSS-REFERENCE TO RELATED APPLICATION

This application is a continuation of copending International Application No. PCT/DE/01/04961 filed Dec. 28, 2001, which designated the United States and was not published in English.

BACKGROUND OF THE INVENTION

Field of the Invention

The invention relates to a data transmission system that has at least two stations between which data bursts are interchanged via radio technology. The invention also relates to a method for data transmission between at least two stations via radio paths using a frequency hopping method.

Data transmission systems such as these are used whenever data is intended to be interchanged over short distances via radio, that is to say for example for interchanging data between the base part and the mobile part of a cordless telephone. Other examples relate to interchanging data between a PC and peripherals, between the game pad of a game console and the associated fixed station, etc.

Various unlicensed frequency bands are reserved for such digitally cordless communications systems, such as WDCT, Bluetooth, and HomeRF, that is to say what are referred to as the industrial scientific and medical (ISM) frequency bands, for example at 2.4 GHz.

Data transmission from the base station to the mobile station is referred to as the downlink. The converse situation, when data is transmitted from the mobile stations to the base station, is referred to as the uplink. Data bursts are normally interchanged between the stations using a method based on time slots, or time division multiple access (TDMA).

The responsible standardization authority, the Federal Communication Commission (FCC), has defined rules governing the manner in which data should be interchanged for use of the ISM frequency bands. One of these rules states that wireless data transmission must be carried out using a frequency hopping method (Frequency Hopping Spread Spectrum). The rules also stipulate how many frequency changes must be carried out within specific time intervals.

In order to make it possible to make the necessary changes to the transmission frequency, the transmitter-end and receiver-end local oscillators must in each case be stabilized at new oscillator frequencies. Every change in the transmission frequency requires a time for the frequency synthesizers to stabilize at the respective new transmission frequency. The stabilization times have to be taken into account by use of guard time intervals between the transmission data bursts, and this reduces the data transmission rate.

A transmission and reception system which has two frequency synthesizers is described in Patent Abstract of Japan JP 04 334222 A, in which one frequency synthesizer is responsible for up-mixing the signal that is to be transmitted in the transmission section, and the other frequency synthesizer is responsible for down-mixing a received signal in a reception section.

SUMMARY OF THE INVENTION

It is accordingly an object of the invention to provide a frequency scheme for data transmission systems that overcomes the above-mentioned disadvantages of the prior art devices and methods of this general type, which allows a higher data transmission rate with a simplified method of operation.

With the foregoing and other objects in view there is provided, in accordance with the invention, a data transmission system. The data transmission system contains at least two stations between which data bursts are interchanged via radio. The stations include a first station having a first transmitter which up-mixes the data bursts from baseband to a first channel mid-frequency and transmits them, and a first receiver receiving the data bursts at a second channel mid-frequency and down-mixes them to an intermediate frequency. The first station has a first local oscillator producing a first local frequency required for up-mixing from the baseband to the first channel mid-frequency and required for down-mixing from the second channel mid-frequency to the intermediate frequency. A second station has a second transmitter for up-mixing the data bursts from the baseband to the second channel mid-frequency and transmits them, and a second receiver receiving the data bursts at the first channel mid-frequency and down-mixes them to the intermediate frequency. A frequency hop between the first channel mid-frequency used for a downlink transmission from the first station to the second station and the second channel mid-frequency used for an uplink transmission from the second station to the first station has a magnitude corresponding to a magnitude of the intermediate frequency. The second station has a second local oscillator producing a second local frequency required for up-mixing from the baseband to the second channel mid-frequency and required for down-mixing from the first channel mid-frequency to the intermediate frequency.

The data transmission system according to the invention has at least two stations between which data bursts are interchanged via radio. The first station has a first transmitter which up-mixes data bursts from baseband to a first channel mid-frequency and transmits them, as well as a first receiver which receives data bursts at a second channel mid-frequency and down-mixes them to an intermediate frequency. The second station has a second transmitter which up-mixes data bursts from baseband to the second channel mid-frequency and transmits them, as well as a second receiver which receives data bursts at the first channel mid-frequency and down-mixes them to the intermediate frequency. In this case, the first station has a local oscillator, which produces the local frequency which is required for up-mixing from baseband to the first channel mid-frequency and which is required for down-mixing from the second channel mid-frequency to the intermediate frequency. The second station has a local oscillator, which produces the local frequency which is required for up-mixing from baseband to the second channel mid-frequency and which is required for down-mixing from the first channel mid-frequency to the intermediate frequency.

According to the invention, the difference between the first channel mid-frequency that is used for the downlink transmission from the first intermediate station to the second intermediate station and the second channel mid-frequency, which is used for the uplink transmission from the second station to the first station, corresponds to the intermediate frequency that is used.

The advantage of choosing the two transmission frequencies in this way is that the respective local oscillator frequencies in the first station and in the second station no longer need to be switched between the downlink transmission and the uplink transmission, as has been necessary until now. There is no longer any need to change over the local oscillators between the downlink transmission from the first station to the second station and the uplink transmission from the second station to the first station. For this reason, there is no need for any stabilization phase between the downlink transmission and the uplink transmission, and the corresponding guard time interval can be shortened. This allows higher data transmission rates than in the past.

In other words, when transmitting data between two stations, a transmitter-end baseband signal must first be up-mixed using a transmitter-end oscillator frequency to the first channel mid-frequency. In the second station, the signal that is received at the first channel mid-frequency is down-mixed by a receiver-end oscillator frequency to an intermediate frequency, and the rest of the signal evaluation is then carried out at the intermediate frequency. According to the invention, the local oscillator frequency which is used for down-mixing in the second station is also used for up-mixing from the baseband to the second channel mid-frequency the signal which is to be sent back. Since the baseband signal and the intermediate frequency signal differ by precisely the intermediate frequency $\Delta f$, this results in a frequency hop of the same magnitude as the intermediate frequency between the first channel mid-frequency and the second channel mid-frequency.

The signal that is transmitted back at the second channel mid-frequency can be received in the first station, and can be down-mixed to the intermediate frequency using the unchanged oscillator frequency that is used there. There is therefore no need to change the local oscillator frequency in the course of downlink transmission and uplink transmission, either at the first station or at the second station. Nevertheless, the first channel mid-frequency differs from the second channel mid-frequency, to be precise precisely by the intermediate frequency. Therefore, it is possible to comply with the FCC requirement to carry out a minimum number of frequency changes within specific time intervals with a smaller number of changes to the local oscillator frequency. This also simplifies the control of the local oscillators.

It is advantageous for the first channel mid-frequency to be chosen on a pseudo-random basis. A matching frequency hopping sequence is defined for this purpose at the transmitter end and at the receiver end. The subsequent second channel mid-frequency is then obtained from the respective pseudo-randomly determined first channel mid-frequency by addition or by subtraction of the intermediate frequency.

It is advantageous for the data to be transmitted using a frequency hopping method, with the channel mid-frequency being changed after each transmitted data burst. It is also advantageous for the channel mid-frequency to remain constant during the transmission of a data burst. This ensures that no change in the transmission frequency need occur during a data burst. The change in the transmission frequency and, possibly, the restabilization of the frequency synthesizer can thus take place during the pauses between two data bursts.

According to a further advantageous embodiment of the invention, a noninteger multiple of the channel separation (for example 1 MHz for the 2.4 Ghz frequency band) is chosen as the intermediate frequency (or as the difference between the first and the second channel mid-frequencies). This leads to a pattern of transmission and reception frequencies that are offset with respect to one another. This makes it possible to avoid crosstalk between different channels, and results in a reduction in co-channel and adjacent channel interference.

It is particularly advantageous for the local oscillators to be frequency-stabilized by a phase locked loop. A configuration such as this allows the mixing frequencies that are required in the various transmission and reception appliances to be produced with the required accuracy, with little physical complexity.

According to a further advantageous embodiment of the invention, the data transmission system has a method or device for producing guard time intervals between the various data bursts. One reason for the necessity to provide guard time intervals between the various data bursts is the clock discrepancies between the local oscillators located in different stations. Clock discrepancies such as these that are caused, for example, by clock drift can lead to an overlap between different data bursts. Guard time intervals of appropriate duration must be provided in order to prevent a second data burst from being received while a first data burst is still being transmitted. If the local oscillator frequency has to be changed between two data bursts, a longer guard time interval must be provided, whose duration corresponds at least to the duration of the stabilization process.

It is advantageous for the length of the guard time interval between the downlink transmission from the first station to the second station and the uplink transmission from the second station to the first station to correspond approximately to the clock drift of the respective oscillators. With the solution according to the invention, there is no need to reset the local oscillator frequency between a downlink transmission and an uplink transmission. The required guard time interval may thus be chosen to be shorter than for previous solutions, in which restabilization of the local oscillators was necessary.

According to a further advantageous solution, the stations have a method or device for producing identification information (CAC) at the start of the transmission of each data burst. When a data burst is received, the identification information can be used to deduce whether this belongs to the same piconetwork as the receiver station, or whether this is not the case.

According to a further advantageous refinement of the invention, one of the stations is a base station and the other is a mobile station. Many data transmission systems have a small mobile part that is easy to handle. These may be telephone handsets, gamepads, or organizers, etc., via which the user makes his input.

It is particularly advantageous for the data transmission system to be used in cordless communications systems. It is also advantageous for the data transmission system to be used in computer-controlled games systems.

In the method according to the invention for data transmission between at least two stations via radio paths using a frequency hopping method, a first signal is first up-mixed from baseband and is transmitted at a first channel mid-frequency from a first station to a second station, with the local frequency which is required for up-mixing from baseband to the first channel mid-frequency and which is required for down-mixing from the second channel mid-frequency to the intermediate frequency being produced by a local oscillator in the first station. The first signal is received by the second station and is down-mixed to an intermediate frequency. The second station then up-mixes a second signal from the baseband and transmits it at a second channel mid-frequency to the first station, with the local frequency which is required for up-mixing from baseband to the second channel mid-frequency and which is required for down-mixing from the first channel mid-frequency to the intermediate frequency being produced by a local oscillator in the second station. According to the invention, the first channel mid-frequency and the second mid-frequency differ precisely by the intermediate frequency. The second signal is received by the first station and is down-mixed to the intermediate frequency. If the first channel mid-frequency and the second channel mid-frequency are chosen in accordance with the invention, there is no need for any time-consuming resetting of the oscillator frequencies either at the transmitter end or at the receiver end.

Other features which are considered as characteristic for the invention are set forth in the appended claims.

Although the invention is illustrated and described herein as embodied in a frequency scheme for data transmission systems, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
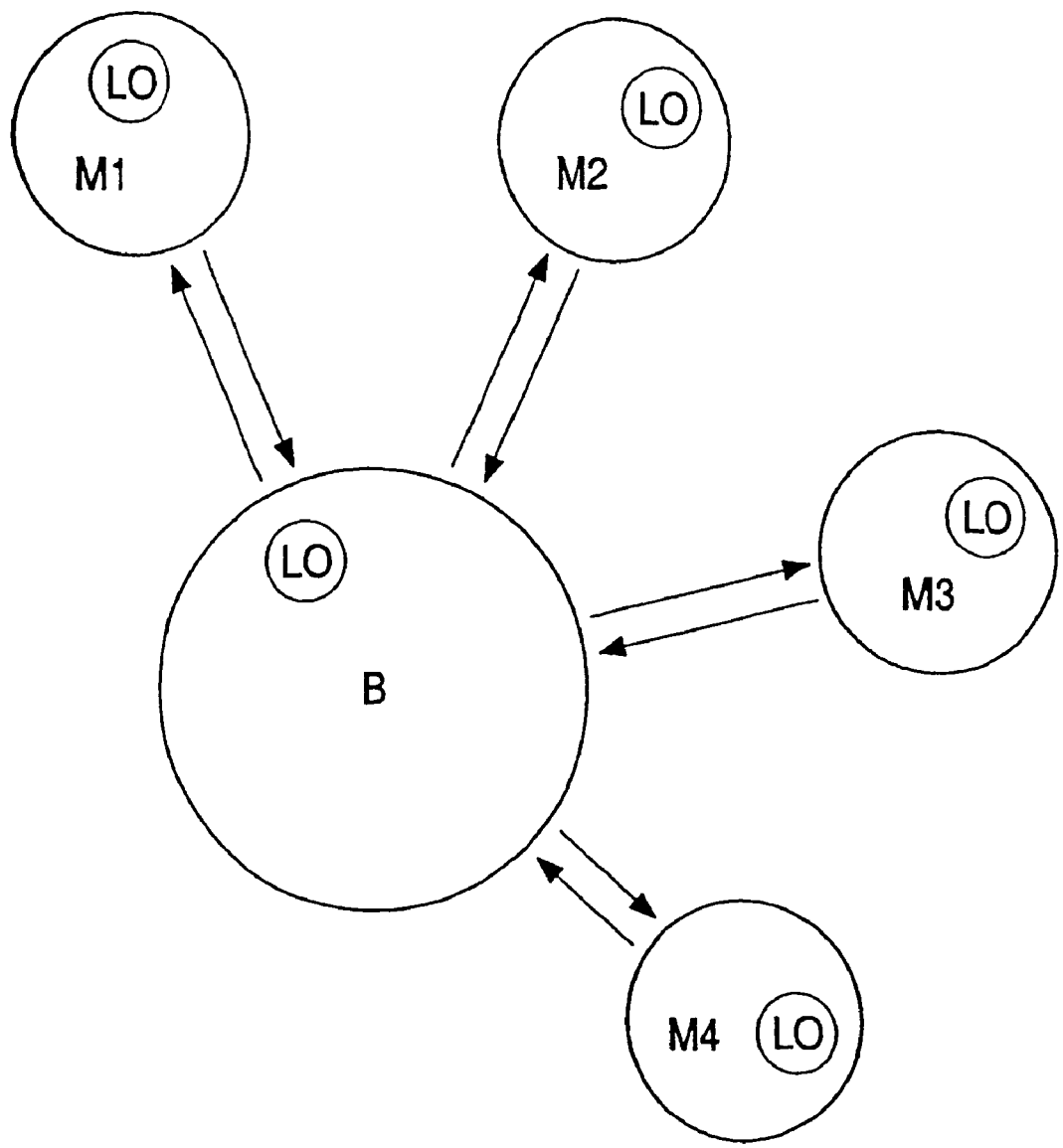
FIG. 1 is an illustration of a data transmission system that contains one base station and four mobile stations according to the prior art.

Referring now to the figures of the drawing in detail and first, particularly, to FIG. 1 thereof, there is shown a data transmission system which contains a base station B and, by way of example, four mobile stations Mi (i=1, . . . , 4). The base station B may transmit data via radio to each of the mobile stations Mi. The mobile station Mi can likewise transmit data via radio to the base station B. For data transmission via radio, the base station B and the mobile stations Mi each have a local oscillator LO. A data transmission system such as this containing a base station and N mobile stations is referred to as piconetwork, and has only a short range.

Figure 2:
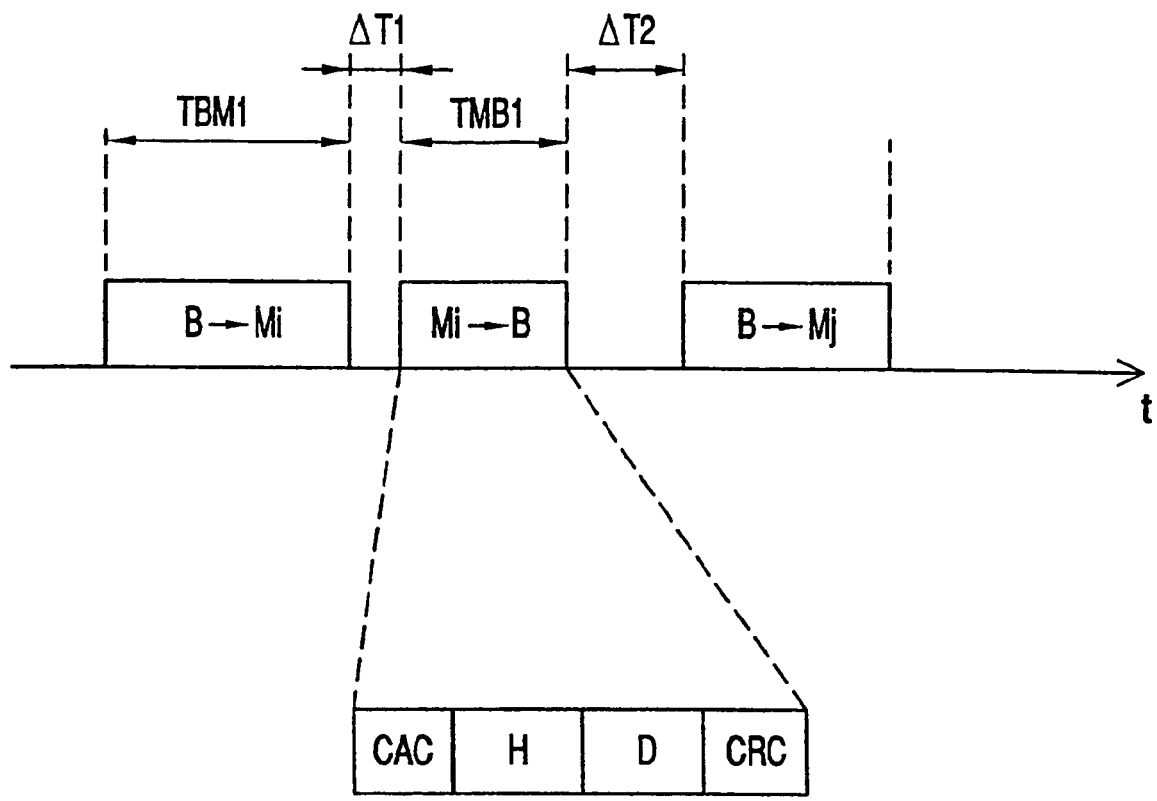
FIG. 2 is an illustration of a burst structure that is used for interchanging data between the base station and the mobile stations.

FIG. 2 shows data bursts being interchanged between the base station B and the mobile stations Mi, Mj over a period of time. First, a data burst "B→Mi" is transmitted from the base station B to the mobile station Mi (downlink).

The data is transmitted at a channel mid-frequency $f_{2n}$; the transmission time period is TBM1. The transmission of the n-th downlink data burst is followed by a guard time interval $\Delta T1$ during which no data is transmitted. The uplink data burst "Mi→B" is then transmitted back from the mobile station Mi to the base station B. For the solution according to the invention, the channel mid-frequency $f_{2n+1}$ is used for the uplink transmission and, in the solution according to the invention, this differs by the intermediate frequency $\Delta f$ from the previously used channel mid-frequency $f_{2n}$. The transmission duration of the n-th uplink data burst "Mi→B" is TMB1. The transmission of the data burst is followed by the guard time interval $\Delta T2$.

The solution according to the invention allows different frequencies to be used for transmission of the data bursts "B→Mi" and "Mi→B", thus making it possible to comply with the requirement for frequent frequency changes in accordance with the FCC Standard, without the local oscillators having to be restabilized during the guard time interval $\Delta T1$. The guard time interval $\Delta T1$ is thus of such a length that clock discrepancies between the transmitter and receiver can be compensated for, in order in this way to prevent any overlap between the data bursts.

During the guard time interval $\Delta T2$, the transmitter-end and receiver-end local oscillators are then set to new frequencies. The frequencies are chosen on a pseudo-random basis using a predetermined frequency hopping scheme. In order to ensure that a stable local oscillator frequency is available at the start of the transmission of the data burst "B→Mi", the duration of the guard time interval $\Delta T2$ is chosen to match the stabilization time of the phase locked loops (PLL). The advantage of the solution according to the invention is therefore that $\Delta T1$ can be chosen to be shorter than $\Delta T2$.

Each of the data bursts that are shown in FIG. 2 has different groups of data and information. By way of example, in the Bluetooth Standard, identification information channel access code (CAC) for the piconetwork is transmitted at the start of a data burst, followed by the actual data block that is to be transmitted, with header information H, payload data D and a check bit pattern cyclic redundancy check (CRC) for error identification and correction for the transmitted payload data D.

Figure 3A:
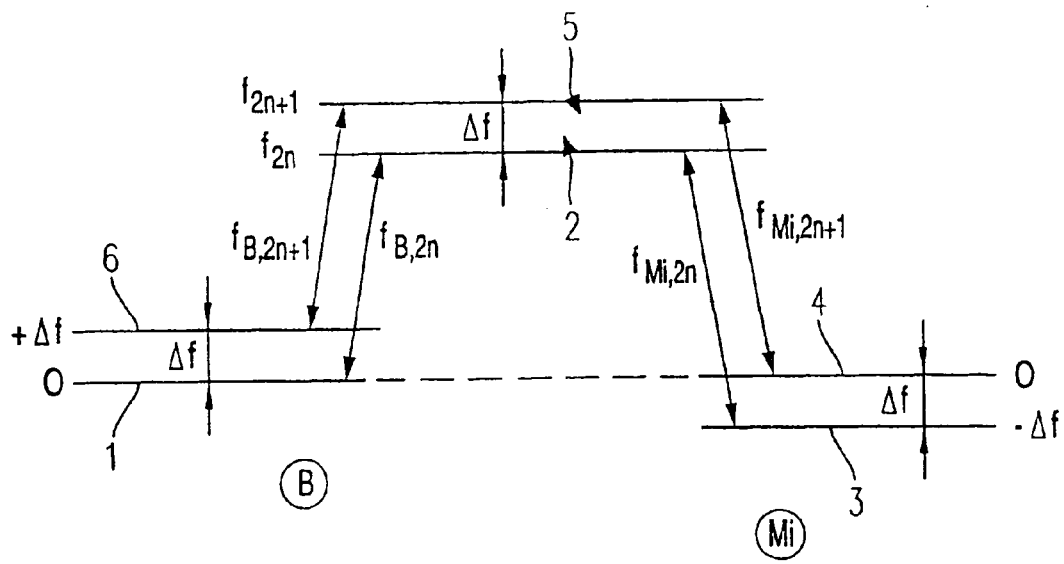
FIG. 3A is an illustration of a frequency scheme for transmitter-end and receiver-end local oscillator frequencies, and the transmission frequencies that are used.
Figure 3B:
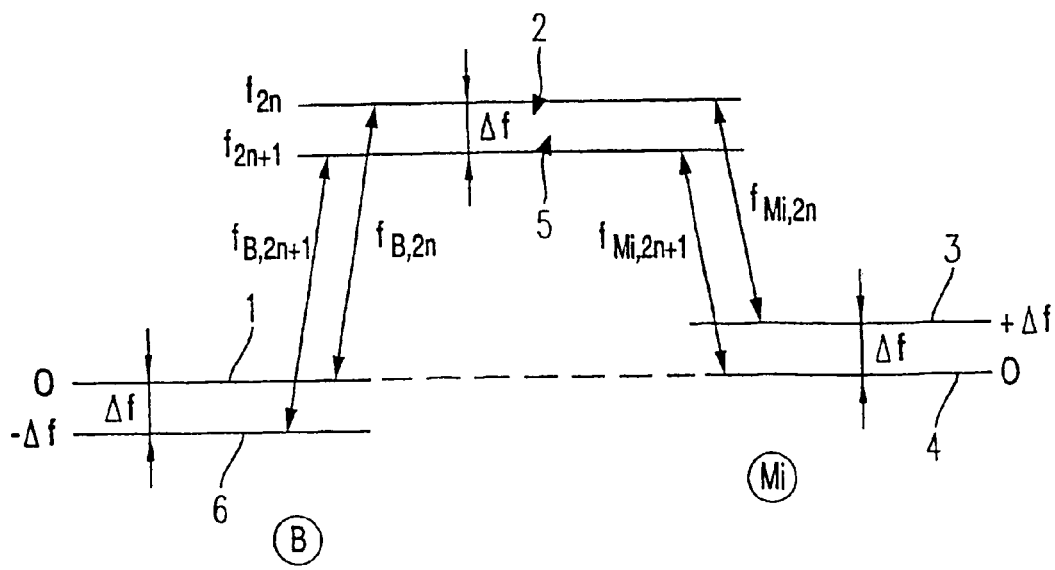
FIG. 3B is an illustration of an alternative frequency scheme to the scheme shown in FIG. 3A.

FIGS. 3A and 3B show two alternative frequency schemes for transmitting data between the base station B and the mobile station Mi.

The situation illustrated in FIG. 3A will be described first. The signal to be transmitted is in the form of a baseband signal 1 at the base station B end, and the signal is intended to be transmitted in a first data burst "B→Mi" to the mobile station Mi. For this purpose, the baseband signal 1 is up-mixed to the transmission frequency $f_{2n}$ by use of the local oscillator frequency $f_{B,2n}$ at the base station end. The transmission frequency $f_{2n}$ is used for the downlink transmission 2 from the base station to the mobile station. The radio-frequency signal which is received by the mobile station Mi is down-mixed to the intermediate frequency band 3 by the local oscillator frequency $f_{Mi,2n}$ which is produced at the mobile station end, with the intermediate frequency band 3 being at the frequency $-\Delta f$. The intermediate frequency signal is then evaluated further.

For the uplink transmission, the baseband signal 4 at the mobile station Mi end is intended to be transmitted to the base station B. To do this, it is transformed up by the local oscillator frequency $f_{Mi,2n+1}$ to the frequency $f_{2n+1}$ which will be used for the transmission.

In this case:

$f_{Mi,2n}=f_{Mi,2n+1}$ in order that the local oscillator at the mobile station end does not need to be stabilized at a new frequency. The uplink transmission 5 from the mobile station Mi to the base station B then takes place at the transmission frequency $f_{2n+1}$. Since the intermediate frequency signal 3 at the mobile station end differs from the baseband signal 4 by the frequency $\Delta f$, the transmission frequencies that are used for the downlink transmission 2 and for the uplink transmission 5 must also differ by precisely $\Delta f$:

$$f_{2n+1} = f_{2n} + \Delta f$$

The signal which is transmitted back at the transmission frequency $f_{2n+1}$ is received by the base station B and is down-mixed to the intermediate frequency band by the local oscillator frequency $f_{B,2n+1}$ there. The intermediate frequency signal 6 obtained in this way can then be processed further.

Changing the frequency of the local oscillator should also be avoided at the base station end. Therefore:

$$f_{B,2n} = f_{B,2n+1}$$

This can be satisfied if the intermediate frequency at the base station end is $+\Delta f$.

FIG. 3B shows an alternative frequency scheme. The baseband signal 1 at the base station end is up-mixed by the local oscillator frequency $f_{B,2n}$ to the transmission frequency $f_{2n}$, and is transmitted to the mobile station Mi as the data burst "B→Mi". The mobile station Mi receives the radio-frequency signal and down-mixes it to an intermediate frequency signal 3 at the frequency $\Delta f$ by of the local oscillator frequency $f_{Mi,2n}$.

For the uplink transmission of the data burst "Mi→B", the baseband signal 4 is up-mixed using the local oscillator frequency $f_{Mi,2n+1}$ to the transmission frequency $f_{2n+1}$ that is used for the uplink transmission 5. The local oscillator frequency in the mobile station Mi is not changed between the downlink transmission 2 and the uplink transmission 5, and therefore:

$$f_{Mi,2n} = f_{Mi,2n+1}$$

This results in the following relationship between the frequency $f_{2n}$ for the downlink transmission 2 and the frequency $f_{2n+1}$ for the uplink transmission 5:

$$f_{2n+1} = f_{2n} - \Delta f$$

The signal which is transmitted back at the transmission frequency $f_{2n+1}$ is received by the base station and is down-mixed to the intermediate frequency band at the frequency $-\Delta f$ by the local oscillator frequency $f_{B,2n+1}$. The local oscillator frequencies $f_{B,2n}$ and $f_{B,2n+1}$ are then related as follows:

$$f_{B,2n} = f_{B,2n+1}$$

The local oscillator is not restabilized between the downlink transmission and the uplink transmission at the base station end either. The intermediate frequency signal 6 can then be processed further at the receiver end.

Thus, in summary, it can be stated that there is no need to change over the local oscillators between a downlink transmission and an uplink transmission, if the transmission frequency for the downlink transmission $f_{2n}$ and the frequency for the uplink transmission $f_{2n+1}$ differ by the intermediate frequency $\Delta f$.

We claim:

1. A data transmission system, comprising:
at least two stations between which data bursts being interchanged via radio, said stations including:
a first station having a first transmitter for up-mixing the data bursts from baseband to a first channel mid-frequency and for transmitting them, and a first receiver receiving the data bursts at a second channel mid-frequency and down-mixing them to an intermediate frequency, said first station having a first local oscillator producing a first local frequency required for up-mixing from the baseband to the first channel mid-frequency and required for down-mixing from the second channel mid-frequency to the intermediate frequency; and
a second station having a second transmitter up-mixing the data bursts from the baseband to the second channel mid-frequency and transmitting them, and a second receiver receiving the data bursts at the first channel mid-frequency and down-mixing them to the intermediate frequency, a frequency hop between the first channel mid-frequency used for a downlink transmission from said first station to said second station and the second channel mid-frequency used for an uplink transmission from said second station to said first station has a magnitude corresponding to a magnitude of the intermediate frequency, said second station having a second local oscillator producing a second local frequency required for up-mixing from the baseband to the second channel mid-frequency and required for down-mixing from the first channel mid-frequency to the intermediate frequency.

2. The data transmission system according to claim 1, wherein the first channel mid-frequency is chosen on a pseudo-random basis.

3. The data transmission system according to claim 1, wherein data is transmitted using a frequency hopping method, with the channel mid-frequency being changed after each transmitted data burst.

4. The data transmission system according to claim 1, wherein the channel mid-frequency is constant during a transmission of a data burst.

5. The data transmission system according to claim 1, wherein a difference between the first channel mid-frequency and the second channel mid-frequency is a noninteger multiple of channel separation.

6. The data transmission system according to claim 1, wherein said first and second local oscillators are frequency-stabilized by a phase locked loop.

7. The data transmission system according to claim 1, further comprising means for producing guard time intervals between various data bursts.

8. The data transmission system according to claim 7, wherein a length of a guard time interval between the downlink transmission from said first station to said second station and the uplink transmission from said second station to said first station corresponds approximately to a clock drift of a corresponding one of said first and second local oscillators.

9. The data transmission system according to claim 1, wherein said first and second stations have means for producing identification information at a start of a transmission of each data burst.

10. The data transmission system according to claim 1, wherein transmission frequencies within an ISM frequency band are used.

11. The data transmission system according to claim 1, wherein said first station and said second station are part of a piconetwork.

12. The data transmission system according to claim 1, wherein one of said first and second stations is a base station and the other is a mobile station.

13. The data transmission system according to claim 1, wherein the data transmission system can be used in cordless communication systems, in computer-controlled entertainment systems, or in computer-controlled games systems.

14. A method for data transmission between at least two stations via radio paths using a frequency hopping method, which comprises the steps of:
- up-mixing from baseband and transmitting a first signal from a first station to a second station at a first channel mid-frequency;
- receiving the first signal in the second station and down-mixing the first signal to an intermediate frequency;
- up-mixing from the baseband and transmitting a second signal from the second station to the first station at a second channel mid-frequency differing from the first channel mid-frequency by the intermediate frequency;
- receiving the second signal in the first station and down-mixing the second signal to the intermediate frequency;
- producing a first local frequency required for up-mixing from the baseband to the first channel mid-frequency and required for down-mixing from the second channel mid-frequency to the intermediate frequency using a first local oscillator in the first station; and
- producing a second local frequency required for up-mixing from the baseband to the second channel mid-frequency and required for down-mixing from the first channel mid-frequency to the intermediate frequency using a second local oscillator in the second station.

15. The method according to claim 14, which further comprises choosing the first channel mid-frequency on a pseudo-random basis.

16. The method according to claim 14, which further comprises transmitting data using the frequency hopping method, and changing the channel mid-frequency after each transmitted data burst.

17. The method according to claim 14, which further comprises setting the channel mid-frequency to remain constant during the transmission of a data burst.

18. The method according to claim 14, which further comprises including guard time intervals between the transmission of the various data bursts.

19. The method according to claim 14, which further comprises choosing a noninteger multiple of channel separation as the intermediate frequency.

20. A data transmission system, comprising:
- at least two stations between which data bursts being interchanged via radio, said stations including:
  - a first station having a first transmission means for up-mixing the data bursts from baseband to a first channel mid-frequency and transmitting them, and a first reception means for receiving the data bursts at a second channel mid-frequency and down-mixing them to an intermediate frequency, said first station having a first local oscillator producing a first local frequency required for up-mixing from the baseband to the first channel mid-frequency and required for down-mixing from the second channel mid-frequency to the intermediate frequency; and
  - a second station having a second transmission means for up-mixing the data bursts from the baseband to the second channel mid-frequency and transmitting them, and a second reception means for receiving the data bursts at the first channel mid-frequency and down-mixing them to the intermediate frequency, a frequency hop between the first channel mid-frequency used for a downlink transmission from said first station to said second station and the second channel mid-frequency used for an uplink transmission from said second station to said first station has a magnitude corresponding to a magnitude of the intermediate frequency, said second station having a second local oscillator producing a second local frequency required for up-mixing from the baseband to the second channel mid-frequency and required for down-mixing from the first channel mid-frequency to the intermediate frequency.

* * * * *